US011451390B2

(12) United States Patent
Munro

(10) Patent No.: US 11,451,390 B2
(45) Date of Patent: Sep. 20, 2022

(54) METHODS FOR MINIMIZING AN ERROR CONDITION WITH SEPARATELY GENERATED SECRET KEYS BASED UPON ONE OR MORE SHARED CHARACTERISTICS AND DEVICES THEREOF

(71) Applicant: Munro Design & Technologies, LLC, Ontario, NY (US)

(72) Inventor: James Fredric Munro, Ontario, NY (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 36 days.

(21) Appl. No.: 17/131,042

(22) Filed: Dec. 22, 2020

(65) Prior Publication Data

US 2021/0203499 A1 Jul. 1, 2021

Related U.S. Application Data

(60) Provisional application No. 62/954,004, filed on Dec. 27, 2019.

(51) Int. Cl.
*H04L 29/06* (2006.01)
*H04L 9/12* (2006.01)
*H04L 9/08* (2006.01)

(52) U.S. Cl.
CPC .............. *H04L 9/12* (2013.01); *H04L 9/0866* (2013.01); *H04L 2209/80* (2013.01)

(58) Field of Classification Search
CPC ...... H04L 9/12; H04L 9/0866; H04L 2209/80
See application file for complete search history.

(56) References Cited

U.S. PATENT DOCUMENTS 7,202,941 B2  4/2007 Munro
8,320,562 B2 11/2012 Hammond et al.
(Continued)

FOREIGN PATENT DOCUMENTS

CA       2053865 C  *  5/2000  .......... H04L 9/0656
WO  WO-2004010640 A1 *  1/2004  .......... H04L 9/0872
WO  WO-2007121178 A2 * 10/2007  .......... H04L 9/0838

OTHER PUBLICATIONS

Keuninckx, Lars, et al. "Encryption key distribution via chaos synchronization." Scientific reports 7.1 (2017): 1-14. (Year: 2017).*
(Continued)

*Primary Examiner* — Shawnchoy Rahman
(74) *Attorney, Agent, or Firm* — Troutman Pepper Hamilton Sanders LLP (Rochester)

(57) ABSTRACT

A method, non-transitory computer readable medium and device that minimize error conditions with substantially simultaneously and independently generated secret keys includes synchronizing with a mobile device configured to execute a corresponding key generation process. Data obtained based on at least one shared characteristic with the synchronized mobile device is converted into a plurality of binary numbers. At least one bit for each of the plurality of binary numbers which are at least measurably random is identified. An error condition with any of the determined bits for the plurality of binary numbers is identified. At least a portion of the determined bits for the plurality of binary numbers without the detected error condition are selected. A key is generated based on the selected determined bits for the plurality of binary numbers for use in securing communications with the synchronized mobile device.

21 Claims, 8 Drawing Sheets

(56) References Cited

U.S. PATENT DOCUMENTS

2012/0314863 A1* 12/2012 Troupe .................. H04B 10/70
　　　　　　　　　　　　　　　　　　　　　　380/256
2013/0236007 A1　　9/2013　Munro et al.

OTHER PUBLICATIONS

Evtyushkin, Dmitry, and Dmitry Ponomarev. "Covert channels through random number generator: Mechanisms, capacity estimation and mitigations." Proceedings of the 2016 ACM SIGSAC conference on computerand communications security. 2016. (Year: 2016).*

* cited by examiner

| Key Bit # | Distance | Phase | Phase-Vel | Int (Phase-Vel) | Binary (Phase-Vel) |
|---|---|---|---|---|---|
| 40 | 0.102948 | 0.431226 | 3891241.648 | 3891241 | 001110110110000000101001 |
| 41 | 0.105388 | 0.441449 | 3667509.766 | 3667509 | 001101111111011000110101 |
| 42 | 0.107615 | 0.450776 | 3433077.249 | 3433077 | 001101000110001001110101 |
| 43 | 0.109988 | 0.460718 | 3188768.72 | 3188768 | 001100000101010000100000 |
| 44 | 0.11232 | 0.470484 | 2935282.047 | 2935282 | 001011001100100111110010 |
| 45 | 0.114663 | 0.4803 | 2677387.77 | 2677387 | 001010001101101010001011 |
| 46 | 0.116915 | 0.489732 | 2420935.842 | 2420935 | 001001001111000011000111 |
| 47 | 0.11906 | 0.498718 | 2171856.542 | 2171856 | 001000010010001111010000 |
| 48 | 0.12122 | 0.507767 | 1935872.423 | 1935872 | 000111011000101000000000 |
| 49 | 0.123358 | 0.516719 | 1718834.589 | 1718834 | 000110100011101000110010 |
| 50 | 0.125488 | 0.525642 | 1526585.072 | 1526585 | 000101110100101100111001 |
| 51 | 0.12745 | 0.533861 | 1364825.146 | 1364825 | 000101001101001101011001 |
| 52 | 0.129364 | 0.541878 | 1239201.956 | 1239201 | 000100101101000010100001 |
| 53 | 0.131185 | 0.549504 | 1155024.568 | 1155024 | 000100001100111111010000 |
| 54 | 0.133064 | 0.557379 | 1117734.714 | 1117734 | 000100010000111000100110 |
| 55 | 0.134736 | 0.56438 | 1132892.841 | 1132892 | 000100010100100101011100 |
| 56 | 0.136355 | 0.571161 | 1197944.333 | 1197944 | 000100100100011101111000 |
| 57 | 0.137867 | 0.577495 | 1307835.662 | 1307835 | 000100111111010010111011 |
| 58 | 0.139237 | 0.583236 | 1457231.33 | 1457231 | 000101100011110001001111 |
| 59 | 0.140554 | 0.588752 | 1640840.375 | 1640840 | 000110010000100110001000 |
| 60 | 0.141854 | 0.594197 | 1853080.147 | 1853080 | 000111000100011010011000 |
| 61 | 0.142917 | 0.59865 | 2088249.235 | 2088249 | 000111111101110100111001 |
| 62 | 0.143943 | 0.602948 | 2340830.913 | 2340830 | 001000111011011111011110 |
| 63 | 0.144869 | 0.606826 | 2605161.528 | 2605161 | 001001111100000001101001 |
| 64 | 0.145626 | 0.609997 | 2875522.356 | 2875522 | 001010111110000010000010 |
| 65 | 0.146385 | 0.613177 | 3146085.23 | 3146085 | 001100000000000101100101 |
| 66 | 0.146923 | 0.615429 | 3410788.827 | 3410788 | 001101000000101101100100 |
| 67 | 0.147378 | 0.617335 | 3667688.634 | 3667688 | 001101111111011011101000 |
| 68 | 0.147691 | 0.618646 | 3915991.989 | 3915991 | 001110111100000011010111 |
| 69 | 0.147899 | 0.619519 | 4155156.934 | 4155156 | 001111110110011100010100 |
| 70 | 0.148023 | 0.620036 | 4384336.114 | 4384336 | 010000101110011001010000 |
| 71 | 0.147954 | 0.619748 | 4602849.426 | 4602849 | 010001100011101111100001 |
| 72 | 0.147942 | 0.619696 | 4810022.283 | 4810022 | 010010010110010100100110 |
| 73 | 0.147661 | 0.618522 | 5004912.57 | 5004912 | 010011000101111001110000 |
| 74 | 0.147235 | 0.616738 | 5186920.988 | 5186920 | 010011100010101011101000 |
| 75 | 0.146738 | 0.614657 | 5355430.297 | 5355430 | 010100011011011110100110 |
| 76 | 0.146075 | 0.611878 | 5509752.695 | 5509752 | 010101000010010001111000 |
| 77 | 0.145392 | 0.609018 | 5649188.407 | 5649188 | 010101100011001100100100 |
| 78 | 0.144555 | 0.60551 | 5773042.688 | 5773042 | 010110000001011011110010 |
| 79 | 0.143612 | 0.601562 | 5880610.056 | 5880610 | 010110011011101100100010 |
| 80 | 0.142556 | 0.597139 | 5970899.172 | 5970899 | 010110110001101111010011 |
| 81 | 0.141351 | 0.592092 | 6043329.414 | 6043329 | 010111000011011101000001 |
| 82 | 0.140054 | 0.586656 | 6097250.323 | 6097250 | 010111010000100101100010 |
| 83 | 0.138654 | 0.580793 | 6132015.928 | 6132015 | 010111011001000100101111 |
| 84 | 0.137233 | 0.574838 | 6146947.402 | 6146947 | 010111011100101110000011 |
| 85 | 0.135644 | 0.568182 | 6141188.701 | 6141188 | 010111011011010100000100 |
| 86 | 0.133925 | 0.560984 | 6113797.398 | 6113797 | 010111010100101000000101 |
| 87 | 0.132131 | 0.55347 | 6064061.257 | 6064061 | 010111001000011110111101 |
| 88 | 0.130345 | 0.545989 | 5991344.635 | 5991344 | 010110110110101110110000 |
| 89 | 0.128386 | 0.53778 | 5894868.604 | 5894868 | 010110011111001011010100 |
| 90 | 0.126314 | 0.529101 | 5773924.953 | 5773924 | 010110000001101001100100 |

Fixed Device 90F 92F 94F 96F 98F 100F

Figure 3

| Key Bit # | Distance | Phase | Phase-Vel | Int (Phase-Vel) | Binary (Phase-Vel) |
|---|---|---|---|---|---|
| 40 | 0.102889 | 0.430982 | 3892510.717 | 3892510 | 0011101101110010100011110 |
| 41 | 0.105377 | 0.441403 | 3668949.664 | 3668949 | 0011011111111101111010101 |
| 42 | 0.107597 | 0.450701 | 3434709.134 | 3434709 | 0011010001101000110101101 |
| 43 | 0.109962 | 0.460609 | 3190473.997 | 3190473 | 0011000010101110110001001 |
| 44 | 0.112287 | 0.470345 | 2937093.958 | 2937093 | 0010110011010001000000101 |
| 45 | 0.114613 | 0.48009 | 2679211.822 | 2679211 | 0010100011100001101010111 |
| 46 | 0.116853 | 0.489471 | 2422747.065 | 2422747 | 0010010011110111111011011 |
| 47 | 0.119052 | 0.498686 | 2173551.836 | 2173551 | 0010000100101010011011111 |
| 48 | 0.121287 | 0.508045 | 1937539.016 | 1937539 | 0001110110010000010000011 |
| 49 | 0.123303 | 0.516489 | 1720555.248 | 1720555 | 0001101001000000111010111 |
| 50 | 0.125414 | 0.525334 | 1528210.478 | 1528210 | 0001011101010001100100101 |
| 51 | 0.127454 | 0.53388 | 1366222.44 | 1366222 | 0001010011011000110011110 |
| 52 | 0.129361 | 0.541866 | 1240445.026 | 1240445 | 0001001011101101011111101 |
| 53 | 0.131167 | 0.549429 | 1156097.512 | 1156097 | 0001000110100100000000001 |
| 54 | 0.132984 | 0.557043 | 1118605.335 | 1118605 | 0001000100001000110001101 |
| 55 | 0.134677 | 0.564132 | 1133421.334 | 1133421 | 0001000101001011011011011 |
| 56 | 0.13631 | 0.570976 | 1198229.645 | 1198229 | 0001001001001000100010101 |
| 57 | 0.137858 | 0.577458 | 1307944.513 | 1307944 | 0001001111110101001010000 |
| 58 | 0.139293 | 0.58347 | 1457235.709 | 1457235 | 0001011000111100010100111 |
| 59 | 0.140593 | 0.588916 | 1640630.544 | 1640630 | 0001100100001000100110110 |
| 60 | 0.141775 | 0.593864 | 1852565.24 | 1852565 | 0001110001000100100010101 |
| 61 | 0.142936 | 0.59873 | 2087664.771 | 2087664 | 0001111110110101011110000 |
| 62 | 0.143976 | 0.603086 | 2340110.404 | 2340110 | 0010001101101010000111110 |
| 63 | 0.144842 | 0.606715 | 2604196.885 | 2604196 | 0010011101111001010010010 |
| 64 | 0.145601 | 0.609891 | 2874388.036 | 2874388 | 0010101111011100000010100 |
| 65 | 0.14633 | 0.612944 | 3144886.42 | 3144886 | 0010111111111110010110110 |
| 66 | 0.146905 | 0.615355 | 3409698.936 | 3409698 | 0011010000001110010001011 |
| 67 | 0.14733 | 0.617134 | 3666703.53 | 3666703 | 0011011111110011000011111 |
| 68 | 0.147708 | 0.618719 | 3915101.321 | 3915101 | 0011101110111101010111101 |
| 69 | 0.147855 | 0.619333 | 4154340.195 | 4154340 | 0011111101100011111001001 |
| 70 | 0.148044 | 0.620126 | 4383671.928 | 4383671 | 0100001011100011101101111 |
| 71 | 0.148059 | 0.620189 | 4602302.786 | 4602302 | 0100011000111001101111101 |
| 72 | 0.147816 | 0.619172 | 4809438.086 | 4809438 | 0100100101100010110111101 |
| 73 | 0.147585 | 0.618204 | 5004551.582 | 5004551 | 0100110001011101000000111 |
| 74 | 0.14728 | 0.616926 | 5186913.301 | 5186913 | 0100111001001010101100001 |
| 75 | 0.146812 | 0.614966 | 5355677.272 | 5355677 | 0101000110111000100111011 |
| 76 | 0.146119 | 0.612062 | 5510131.072 | 5510131 | 0101010000010011111110011 |
| 77 | 0.145411 | 0.609095 | 5649607.852 | 5649607 | 0101011000110100111000111 |
| 78 | 0.144489 | 0.605235 | 5773449.835 | 5773449 | 0101100000011000100010011 |
| 79 | 0.143629 | 0.60163 | 5881026.744 | 5881026 | 0101100110111100111000010 |
| 80 | 0.142518 | 0.596978 | 5971240.73 | 5971240 | 0101101100011101000101000 |
| 81 | 0.141308 | 0.59191 | 6043692.009 | 6043692 | 0101110000111000000101100 |
| 82 | 0.140134 | 0.58699 | 6097729.092 | 6097729 | 0101110100001011010001011 |
| 83 | 0.138738 | 0.581144 | 6132537.301 | 6132537 | 0101110110010011001110011 |
| 84 | 0.137224 | 0.574802 | 6147260.413 | 6147260 | 0101110111001100101111001 |
| 85 | 0.135626 | 0.568109 | 6141204.298 | 6141204 | 0101110110110101000101000 |
| 86 | 0.133931 | 0.561008 | 6113565.17 | 6113565 | 0101110101001001000111011 |
| 87 | 0.132152 | 0.553559 | 6063630.145 | 6063630 | 0101110010000110000011101 |
| 88 | 0.130327 | 0.545914 | 5990772.033 | 5990772 | 0101101101101001011101001 |
| 89 | 0.128332 | 0.537554 | 5894154.256 | 5894154 | 0101100111110000000001010 |
| 90 | 0.126214 | 0.528682 | 5773121.531 | 5773121 | 0101100000010111010000011 |

90M 92M 94M 96M Figure 4 98M 100M

Mobile Device

Figure 5

| Key Bit # | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| 40 | 0 | 0 | 1 | 1 | 1 | 0 | 1 | 1 | 0 | 1 | 1 | 0 | 0 | 1 | 0 | 1 | 0 | 0 | 0 | 1 | 1 | 1 | 1 | 0 |
| 41 | 0 | 0 | 1 | 1 | 0 | 1 | 1 | 1 | 1 | 1 | 1 | 1 | 1 | 0 | 1 | 1 | 1 | 1 | 0 | 1 | 0 | 1 | 0 | 1 |
| 42 | 0 | 0 | 1 | 1 | 0 | 1 | 0 | 0 | 0 | 1 | 1 | 0 | 1 | 0 | 0 | 0 | 1 | 1 | 0 | 1 | 0 | 1 | 0 | 1 |
| 43 | 0 | 0 | 1 | 1 | 0 | 0 | 0 | 0 | 1 | 0 | 1 | 0 | 1 | 1 | 1 | 0 | 1 | 1 | 0 | 0 | 1 | 0 | 0 | 1 |
| 44 | 0 | 0 | 1 | 0 | 1 | 1 | 0 | 0 | 1 | 1 | 0 | 1 | 0 | 0 | 0 | 1 | 0 | 0 | 0 | 0 | 0 | 1 | 0 | 1 |
| 45 | 0 | 0 | 1 | 0 | 1 | 0 | 0 | 0 | 1 | 1 | 1 | 0 | 0 | 0 | 0 | 1 | 1 | 0 | 1 | 0 | 1 | 0 | 1 | 1 |
| 46 | 0 | 0 | 1 | 0 | 0 | 1 | 0 | 0 | 1 | 1 | 1 | 0 | 1 | 1 | 1 | 1 | 1 | 0 | 1 | 1 | 0 | 1 | 1 | 1 |
| 47 | 0 | 0 | 1 | 0 | 0 | 0 | 0 | 1 | 0 | 0 | 1 | 0 | 1 | 0 | 1 | 0 | 0 | 1 | 1 | 0 | 1 | 1 | 1 | 1 |
| 48 | 0 | 0 | 0 | 1 | 1 | 1 | 0 | 1 | 1 | 0 | 0 | 1 | 0 | 0 | 0 | 0 | 0 | 1 | 0 | 0 | 0 | 0 | 0 | 1 |
| 49 | 0 | 0 | 0 | 1 | 1 | 0 | 1 | 0 | 0 | 1 | 0 | 0 | 0 | 0 | 0 | 1 | 1 | 1 | 0 | 1 | 0 | 1 | 1 | 1 |
| 50 | 0 | 0 | 0 | 1 | 0 | 1 | 1 | 1 | 0 | 1 | 0 | 1 | 0 | 0 | 0 | 1 | 1 | 0 | 0 | 1 | 0 | 0 | 1 | 0 |
| 51 | 0 | 0 | 0 | 1 | 0 | 1 | 0 | 0 | 1 | 1 | 0 | 1 | 1 | 0 | 0 | 0 | 1 | 1 | 0 | 0 | 1 | 1 | 1 | 0 |
| 52 | 0 | 0 | 0 | 1 | 0 | 0 | 1 | 0 | 1 | 1 | 1 | 0 | 1 | 1 | 0 | 1 | 0 | 1 | 1 | 1 | 1 | 1 | 0 | 1 |
| 53 | 0 | 0 | 0 | 1 | 0 | 0 | 0 | 1 | 1 | 0 | 1 | 0 | 0 | 1 | 0 | 0 | 0 | 0 | 0 | 0 | 0 | 0 | 0 | 1 |
| 54 | 0 | 0 | 0 | 1 | 0 | 0 | 0 | 1 | 0 | 0 | 0 | 1 | 0 | 0 | 0 | 1 | 1 | 0 | 0 | 0 | 1 | 1 | 0 | 1 |
| 55 | 0 | 0 | 0 | 1 | 0 | 0 | 0 | 1 | 0 | 1 | 0 | 0 | 1 | 0 | 1 | 1 | 0 | 1 | 1 | 0 | 1 | 1 | 0 | 1 |
| 56 | 0 | 0 | 0 | 1 | 0 | 0 | 1 | 0 | 0 | 1 | 0 | 0 | 1 | 0 | 0 | 0 | 1 | 0 | 0 | 1 | 0 | 1 | 0 | 1 |
| 57 | 0 | 0 | 0 | 1 | 0 | 0 | 1 | 1 | 1 | 1 | 1 | 1 | 0 | 1 | 0 | 1 | 0 | 0 | 1 | 0 | 1 | 0 | 0 | 0 |
| 58 | 0 | 0 | 0 | 1 | 0 | 1 | 1 | 0 | 0 | 0 | 1 | 1 | 1 | 1 | 0 | 0 | 0 | 1 | 0 | 1 | 0 | 0 | 1 | 1 |
| 59 | 0 | 0 | 0 | 1 | 1 | 0 | 0 | 1 | 0 | 0 | 0 | 0 | 1 | 0 | 0 | 0 | 1 | 0 | 1 | 1 | 0 | 1 | 1 | 0 |
| 60 | 0 | 0 | 0 | 1 | 1 | 1 | 0 | 0 | 0 | 1 | 0 | 0 | 0 | 1 | 0 | 0 | 0 | 1 | 0 | 0 | 1 | 0 | 0 | 1 |
| 61 | 0 | 0 | 0 | 1 | 1 | 1 | 1 | 1 | 1 | 1 | 0 | 1 | 1 | 0 | 1 | 0 | 1 | 1 | 1 | 1 | 0 | 0 | 0 | 0 |
| 62 | 0 | 0 | 1 | 0 | 0 | 0 | 1 | 1 | 1 | 0 | 1 | 0 | 1 | 0 | 1 | 0 | 0 | 0 | 0 | 1 | 1 | 1 | 1 | 0 |
| 63 | 0 | 0 | 1 | 0 | 0 | 0 | 1 | 1 | 1 | 0 | 1 | 1 | 1 | 1 | 0 | 0 | 1 | 0 | 1 | 0 | 0 | 1 | 0 | 0 |
| 64 | 0 | 0 | 1 | 0 | 1 | 0 | 1 | 1 | 1 | 0 | 1 | 0 | 1 | 1 | 1 | 0 | 0 | 0 | 0 | 0 | 1 | 0 | 0 | 0 |
| 65 | 0 | 0 | 1 | 0 | 1 | 1 | 1 | 1 | 1 | 1 | 1 | 1 | 1 | 1 | 0 | 0 | 1 | 0 | 1 | 1 | 0 | 1 | 1 | 0 |
| 66 | 0 | 0 | 1 | 1 | 0 | 0 | 0 | 0 | 0 | 0 | 0 | 0 | 1 | 1 | 1 | 0 | 0 | 1 | 0 | 0 | 0 | 0 | 1 | 0 |
| 67 | 0 | 0 | 1 | 1 | 0 | 1 | 1 | 1 | 1 | 1 | 1 | 0 | 0 | 1 | 1 | 0 | 1 | 0 | 0 | 0 | 1 | 1 | 1 | 1 |
| 68 | 0 | 0 | 1 | 1 | 1 | 0 | 1 | 1 | 1 | 0 | 1 | 1 | 1 | 1 | 0 | 1 | 0 | 1 | 0 | 1 | 1 | 1 | 0 | 1 |
| 69 | 0 | 0 | 1 | 1 | 1 | 1 | 1 | 1 | 0 | 1 | 1 | 0 | 0 | 0 | 1 | 1 | 1 | 1 | 0 | 0 | 1 | 0 | 0 | 0 |
| 70 | 0 | 1 | 0 | 0 | 0 | 0 | 1 | 0 | 1 | 1 | 1 | 0 | 0 | 0 | 1 | 1 | 1 | 0 | 1 | 1 | 0 | 1 | 1 | 1 |
| 71 | 0 | 1 | 0 | 0 | 0 | 1 | 1 | 0 | 0 | 0 | 1 | 1 | 1 | 0 | 0 | 1 | 0 | 1 | 1 | 1 | 1 | 1 | 1 | 0 |
| 72 | 0 | 1 | 0 | 0 | 1 | 0 | 0 | 1 | 0 | 1 | 1 | 0 | 0 | 0 | 1 | 0 | 1 | 0 | 1 | 0 | 1 | 1 | 1 | 0 |
| 73 | 0 | 1 | 0 | 0 | 1 | 1 | 0 | 0 | 0 | 1 | 0 | 1 | 1 | 1 | 0 | 1 | 0 | 0 | 0 | 0 | 0 | 1 | 1 | 1 |
| 74 | 0 | 1 | 0 | 0 | 1 | 1 | 1 | 1 | 0 | 0 | 1 | 0 | 0 | 1 | 0 | 1 | 0 | 1 | 1 | 0 | 0 | 0 | 0 | 1 |
| 75 | 0 | 1 | 0 | 1 | 0 | 0 | 0 | 1 | 1 | 0 | 1 | 1 | 1 | 0 | 0 | 0 | 1 | 0 | 0 | 1 | 1 | 1 | 0 | 1 |
| 76 | 0 | 1 | 0 | 1 | 0 | 1 | 0 | 0 | 0 | 0 | 1 | 0 | 0 | 1 | 1 | 1 | 1 | 1 | 1 | 0 | 0 | 1 | 1 | 1 |
| 77 | 0 | 1 | 0 | 1 | 0 | 1 | 1 | 0 | 0 | 1 | 1 | 0 | 1 | 0 | 1 | 0 | 0 | 1 | 0 | 0 | 0 | 1 | 1 | 1 |
| 78 | 0 | 1 | 0 | 1 | 1 | 0 | 0 | 0 | 0 | 0 | 0 | 1 | 1 | 0 | 0 | 1 | 0 | 0 | 0 | 1 | 0 | 0 | 0 | 1 |
| 79 | 0 | 1 | 0 | 1 | 1 | 0 | 0 | 1 | 1 | 0 | 1 | 1 | 1 | 1 | 0 | 0 | 1 | 0 | 0 | 0 | 0 | 0 | 1 | 0 |
| 80 | 0 | 1 | 0 | 1 | 1 | 0 | 1 | 0 | 0 | 0 | 1 | 1 | 0 | 1 | 0 | 0 | 1 | 0 | 1 | 0 | 1 | 0 | 0 | 0 |
| 81 | 0 | 1 | 0 | 1 | 1 | 1 | 0 | 0 | 0 | 0 | 1 | 1 | 1 | 0 | 0 | 0 | 0 | 0 | 1 | 0 | 1 | 1 | 0 | 0 |
| 82 | 0 | 1 | 0 | 1 | 1 | 1 | 0 | 1 | 0 | 0 | 0 | 0 | 1 | 0 | 1 | 1 | 0 | 1 | 0 | 0 | 0 | 0 | 0 | 1 |
| 83 | 0 | 1 | 0 | 1 | 1 | 1 | 0 | 1 | 1 | 0 | 0 | 1 | 0 | 0 | 1 | 1 | 0 | 0 | 1 | 1 | 1 | 0 | 0 | 1 |
| 84 | 0 | 1 | 0 | 1 | 1 | 1 | 0 | 1 | 1 | 0 | 0 | 1 | 0 | 0 | 0 | 1 | 0 | 1 | 1 | 1 | 1 | 0 | 0 | 0 |
| 85 | 0 | 1 | 0 | 1 | 1 | 1 | 0 | 1 | 1 | 0 | 1 | 0 | 1 | 0 | 1 | 0 | 0 | 0 | 1 | 0 | 1 | 0 | 0 | 0 |
| 86 | 0 | 1 | 0 | 1 | 1 | 1 | 0 | 1 | 0 | 1 | 0 | 0 | 1 | 0 | 1 | 0 | 0 | 0 | 1 | 1 | 1 | 0 | 0 | 1 |
| 87 | 0 | 1 | 0 | 1 | 1 | 1 | 0 | 0 | 1 | 0 | 0 | 0 | 0 | 1 | 1 | 0 | 0 | 0 | 0 | 0 | 1 | 1 | 1 | 0 |
| 88 | 0 | 1 | 0 | 1 | 1 | 0 | 1 | 1 | 0 | 1 | 0 | 1 | 0 | 0 | 1 | 0 | 1 | 1 | 1 | 0 | 1 | 0 | 0 | 0 |
| 89 | 0 | 1 | 0 | 1 | 1 | 0 | 0 | 1 | 1 | 1 | 1 | 0 | 0 | 0 | 0 | 0 | 0 | 0 | 0 | 0 | 1 | 0 | 1 | 0 |
| 90 | 0 | 1 | 0 | 1 | 1 | 0 | 0 | 0 | 0 | 0 | 1 | 0 | 1 | 1 | 1 | 0 | 1 | 0 | 0 | 0 | 0 | 0 | 0 | 1 |

Figure 6

METHODS FOR MINIMIZING AN ERROR CONDITION WITH SEPARATELY GENERATED SECRET KEYS BASED UPON ONE OR MORE SHARED CHARACTERISTICS AND DEVICES THEREOF

This application claims the benefit of Provisional Patent Application Ser. No. 62/954,004, filed Dec. 27, 2019, which is hereby incorporated by reference in its entirety.

FIELD

This technology generally relates to methods and devices for cryptographic communications and, more particularly, to methods and devices that minimize an error condition with substantially simultaneously and independently generated secret keys used for encryption and decryption of data sent between two electronic devices based on measurements of one or more common or shared characteristics of the devices. This technology also provides for an improvement in the robustness of the cryptographic algorithm allowing the algorithm to successfully operate in areas of decreased SNR.

BACKGROUND

A recurring problem in symmetric cryptography is the distribution of secret keys. Secret keys are required for symmetric encryption and decryption of messages transmitted over an insecure medium, such as over a wireless radio link or over the Internet. In electronic communications, secret keys are also used to provide a secure integrity check that ensures messages have not been modified during transmission. In addition, electronic communication systems also routinely use knowledge of secret keys to demonstrate proof of identity (authentication).

Unfortunately, it is problematic to distribute a secret key over a communication channel before that communication channel has been secured. The paradox is that the communication channel cannot be secured until the secret key has been distributed—this is the "chicken and egg" problem for symmetric encryption systems. Two methods are in common commercial use for avoiding this problem.

The first commonly-used method of solving the key distribution problem is to utilize a public-key encryption system and avoid the distribution of secret keys. Each party in a public-key communication scheme has two keys: a public key that may be widely known and a private key that is known only to the appropriate party. To communicate with another party, the transmitting party need only have knowledge of the recipient's public key. The recipient is responsible for keeping its private key safe. Public-key cryptography partially solves the initial key distribution problem that plague symmetric encryption algorithms, but the algorithms used for public-key encryption and decryption are computationally intensive and are susceptible to being hacked or broken with quantum computing methods.

The second commonly-used method of solving the key distribution problem is to have the communication parties jointly agree upon a secret key without transmitting the secret key over the insecure communication channel. Several algorithms are available and in wide use in commercially-available electronic communication systems today. Most of these algorithms are based upon the infeasibility of performing some types of mathematical operations, such as computing the discrete logarithm of a very large number containing hundreds of digits. In other words, the strength of the key agreement algorithm rests upon the assumption that it is computationally infeasible for an attacker to bypass the algorithm. But unfortunately, these methods can also be hacked or broken with quantum computing methods.

One approach for secret key generation that appears to be quantum proof is disclosed in U.S. Pat. No. 8,320,562, which is hereby incorporated by reference in its entirety, in which a swiping motion of a mobile device past a fixed device is measured concurrently by both devices, and a table of floating-point distance values as a function of time are generated, truncated to an integer data type, converted to binary, and then a set of bits are selected from the binary table values for use as the secret keys. Note that since each device measures the same swipe profile at the same time, each device can independently arrive at the same sequence of key bits based on the profile.

Although this approach has been effective in addressing the issues discussed above, it has been discovered that random noise in the key generation process can cause a low-order (non-key) bit to change its value, and under the right circumstances the value changes can propagate to higher-order bits and cause their values to change as well. Indeed, under some conditions the low-order noise can ripple upward and cause a key-bit to change as well at one device, but not at the other device, thereby causing the keys generated at the devices to not match.

SUMMARY

A method that minimizes an error condition with substantially simultaneously and independently generated secret keys includes synchronizing, by a computing device, with a mobile device configured to execute a corresponding key generation process. Data obtained based on at least one shared characteristic with the synchronized mobile device is converted, by the computing device, into a plurality of binary numbers. At least one bit for each of the plurality of binary numbers which are at least measurably random is identified by the computing device. An error condition with any of the determined bits for the plurality of binary numbers is identified, by the computing device. At least a portion of the determined bits for the plurality of binary numbers without the detected error condition are selected, by the computing device. A key is generated, by the computing device, based on the selected determined bits for the plurality of binary numbers for use in securing communications with the synchronized mobile device.

A non-transitory computer readable medium having stored thereon instructions comprising executable code which when executed by one or more processors, causes the one or more processors to synchronize with a mobile device configured to execute a corresponding key generation process. Data obtained based on at least one shared characteristic with the synchronized mobile device is converted into a plurality of binary numbers. At least one bit for each of the plurality of binary numbers which are at least measurably random is identified. An error condition with any of the determined bits for the plurality of binary numbers is identified. At least a portion of the determined bits for the plurality of binary numbers without the detected error condition are selected. A key is generated based on the selected determined bits for the plurality of binary numbers for use in securing communications with the synchronized mobile device.

A computing device comprising a memory comprising programmed instructions stored thereon and one or more processors configured to execute the stored programmed instructions to synchronize with a mobile device configured to execute a corresponding key generation process. Data obtained based on at least one shared characteristic with the synchronized mobile device is converted into a plurality of binary numbers. At least one bit for each of the plurality of binary numbers which are at least measurably random is identified. An error condition with any of the determined bits for the plurality of binary numbers is identified. At least a portion of the determined bits for the plurality of binary numbers without the detected error condition are selected. A key is generated based on the selected determined bits for the plurality of binary numbers for use in securing communications with the synchronized mobile device.

This technology provides a number of advantages including providing methods, non-transitory media, and devices that minimize an error condition with substantially simultaneously and independently generating secret keys used for encryption and decryption of data sent between two electronic devices based on measurements of one or more common or shared characteristics of the devices. In particular, with examples of this technology a low-order bit change that can cause the independently-generated secret keys to not match can be detected and then the problematic bit from the secret key can be identified and eliminated at each device so the secret keys once again match. Additionally, with examples of this technology, identical sequences of keying material are created based upon a common property or other shared characteristic of the communicating devices, such as the shared distance or velocity between the devices, and this keying material is then suitable for the establishment of a secure data communication channel.

By way of example, with examples of this technology a common number of key bits is 128 so to generate those key bits a sufficient number of discrete distance or velocity measurements are required that yield 128 random bits. This distance or velocity measurement data is converted to an integer data type and then converted to a binary representation. Next, a bit is selected from each integer, that is not influenced by measurement noise and is measurably random, and is used as a key bit, provided the key bit is not part of a sequence of identically valued bits within the binary representation of the integer data type. A string of such key bits are selected from the measurements to be used as the secret key. Since the measurement setup and the process employed to generate the key bits in these examples of this technology are common to the devices, the devices will independently arrive at the same secret key.

BRIEF DESCRIPTION OF THE DRAWINGS

FIG. 3 is a table of intermediate data used to generate bits from which the secret key is generated at a first device;

FIG. 4 is a table of an example of intermediate data used to generate bits from which the secret key is generated at a second device;

FIG. 5 is a table of an example of binary data used to generate bits from which a secret key is generated with a bit-creep error source at a first device;

FIG. 6 is a table of binary data used to generate bits from which the secret key is generated with bit-creep error source is illustrated at a second device;

DETAILED DESCRIPTION

Figure 1:
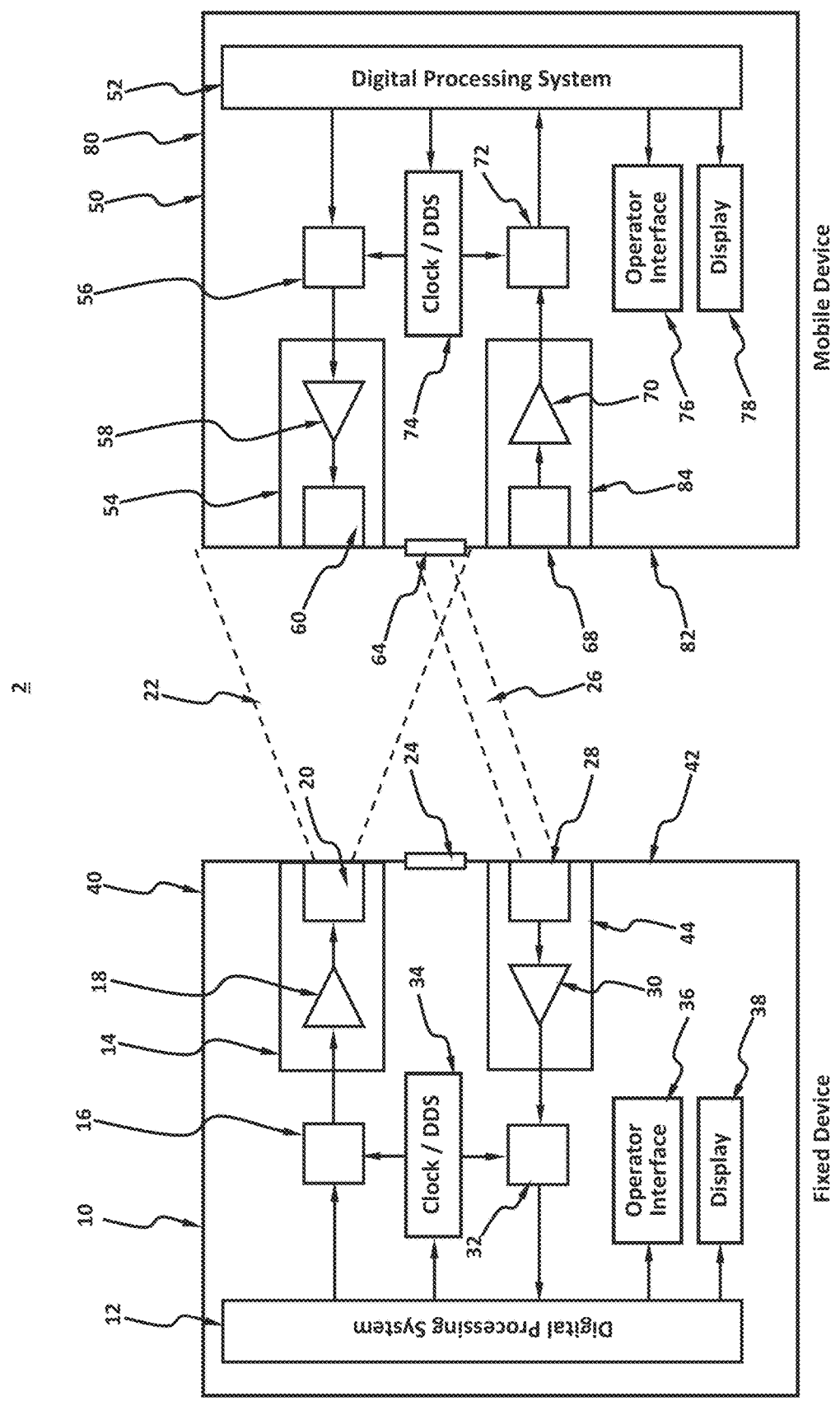
FIG. 1 is a block diagram of an exemplary system that substantially simultaneously and independently minimizes an error condition with the generation of secret keys based on measurements of one or more common or shared characteristics.

An example of a system 2 that substantially simultaneously and independently minimizes an error condition with the generation of secret keys based on measurements of one or more common or shared characteristics is illustrated in FIG. 1. In this particular example, the exemplary system 2 includes a fixed position device 10 with a digital processing system 12, a transmission system 14, and a reception system 44, and a non-fixed position or mobile device 50 with a digital processing system 52, a transmission system 54, and a reception system 84, although the system 2 can include other types and/or numbers of systems, devices components, and/or other elements which are configured in other manners. Accordingly, as illustrated and described by way of the examples herein, this technology provides effective and secure methods and systems for substantially simultaneously and independently minimizes an error condition comprising an error or possible error when generating key material suitable for securing data sent between devices based on measurements of one or more common or shared characteristics.

Referring more specifically to FIG. 1, the exemplary fixed position device 10 is a computing device configured to generate a secret key substantially simultaneously and independently with the mobile device 50 based on one or more shared characteristics, such distance measurements between the fixed position device 10 and the mobile device 50, although other types and/or numbers of other systems and devices which can measure other characteristics, such as velocity, acceleration, or phase, phase-velocity or phase-acceleration by way of example, could be used. Since the structure and operation of systems which could be used to obtain a plurality of measurements of a shared characteristic between devices 10 and 50, such as distance or velocity, are well known to those or ordinary skill in the art, they will not be described in detail herein. By way of example only, a system for obtaining a plurality of distance measurements to a target which could be used herein is disclosed in U.S. Pat. No. 7,202,941, which herein incorporated by reference in its entirety.

Additionally, in this particular example the fixed position device 10 is a point-of-sale (POS) terminal computing device, although other types and/or numbers of computing devices could be used, such as a desktop computer or a mobile computing device which are used in other application by way of example. Additionally, in this particular example, the emissions used by the fixed position device 10 to measure distance are optical, although other types and/or numbers of emissions could be used, such as acoustic or radio emissions by way of example only.

The fixed position device 10 includes a housing 40 with a front face 42 which has a reflecting element 24, although the housing 40 could have other shapes and configurations. The reflecting element 24 is a white diffuse reflector and material on the front face 42 surrounding the reflecting element 24 is absorptive, although other types and/or numbers of reflecting elements and adjacent materials on front face 42 could be used and in other examples the inclusion of a reflecting element may be optional. The reflecting element 24 also may have beaded retroreflectors or prism-based retroreflectors which help with optical gain, although other types and/or numbers of elements which help with optical gain may be used.

The transmission system 14 includes an energy emitter 20 and a driver 18, although the transmission system may comprises other types and/or numbers of other components or other elements in other configurations. An input of the transmission system 14 is coupled to the output of a clock system 34 through a gate 16 circuit where the clock system 34 and gate 16 are configured to generate an emission waveform, such as a burst waveform. In the transmission system 14, the emission waveform may be amplified by the driver 18 and transduced from an electronic signal to emitted energy 22 by the energy emitter 20. The energy emitter 20 transmits the emitted energy 22 in a defined envelope or cone to reduce the probability of interception, although other types and/or numbers of emission paths could be used. The emitted energy 22 is transmitted towards another device, such as the mobile device 50 in this example, for minimizing an error condition with the generation of the bits of the keys to establish secure communications. In this particular example, the energy emitter 20 comprises one or more of LEDs, such as one or more superluminescent diodes, or laser diodes which transmit optical radiation, although other types and/or numbers of energy emitters could be used which emit other emissions in other frequencies of electromagnetic energy, such as RF by way of example. In the example where the energy emitter 20 is configured to emit RF, then the energy emitter 20 comprises an antenna, although other types of emitters may be used. By way of example only, other types of emissions may also be used, such as acoustic, magnetic, electrostatic, or a hybrid of two or more of these. If electromagnetic energy is used, the carrier can be either in the radio frequency (RF) portion of the spectrum or in the millimeter-wave (MMW), microwave, infrared (IR), visible, or ultraviolet (UV) energy.

In this particular example, the clock system 34 and gate 16 are coupled to the digital processing system 12 and generate a burst waveform modulation of emitted energy 22 which is transmitted to the driver 18 and output by the energy emitter 20, although other types and/or numbers of systems, devices, components and/or elements may be used to manage the generation of the emissions.

The reception system 44 includes a receiver 28 and an amplifier 30, although the reception system 44 may comprise other types and/or numbers of other components or other elements in other configurations. In this particular example, the receiver 28 is positioned to receive at least a portion of the emission which is amplified by the amplifier 30, although the reception system 44 may be configured in other manners. In this particular example, the receiver 28 comprises PN, PIN, or APD photodiodes to receive electromagnetic radiation in the optical spectrum, although the receiver 28 may comprise other types and/or numbers of receiving elements and/or other types of emissions could be received. By way of example only, if the received radiation is RF, then the receiver 28 may be an antenna. An output of the reception system 44 is coupled to a sampling system 32, although other configurations may be used.

The sampling system 32 receives and samples the amplified emissions from the reception system 44 which are used for the substantially simultaneously and independently generated secret keys based on measurements of one or more common or shared characteristics between two devices, such as the fixed device 10 and mobile device 50 in this example. The sampled amplified emissions from the sampling system 32 are transmitted to the digital processing system 12. Although in this example a separate transmission system 14 and reception system 44 are shown, other types and/or numbers of systems or devices may be used, such as a transceiver system by way of example.

The digital processing system 12 is coupled to and controls the operations of the gate 16, sampling system 32, clock system 34, the transmission system 14, and the reception system 44, although other types and/or numbers of processing systems coupled to other types and/or numbers of systems, devices, components, or other elements in other configurations could be used. The digital processing system 12 includes a processing unit and a memory which are coupled together, although the digital processing system 12 can have other types and/or numbers of systems, devices, components, or other elements in other locations and configurations. For example, an operator interface 36 and a display 38 are coupled to the digital processing system 12, but in other examples could be part of the digital processing system 12.

The memory stores programmed instructions and data for execution by processing unit for minimizing an error condition with the generation of one or more secret keys as described and illustrated by way of the examples herein, including: synchronizing with a mobile device configured to execute a corresponding key generation process; converting data obtained based on at least one shared characteristic with the synchronized mobile device into a plurality of binary numbers; determining, by the computing device, a subset of bits from a set of bits for each of the plurality of binary numbers which are measurably random; detecting an error with any of the subsets of one or more bits for each of the plurality of binary numbers; selecting at least one of the subsets of one or more bits for the plurality of binary numbers without the detected error; and gene rating a key based on the selected at least one of the subsets of one or more bits for the plurality of binary numbers for use in securing communications with the synchronized mobile device, although other types and/or numbers of instructions and data can be stored and executed and some or all of these instructions and data may be stored elsewhere. A variety of different types of memory storage devices, such as a random access memory (RAM), a read only memory (ROM), hard disk, CD ROM, DVD, or other computer readable medium which is read from and/or written to by a magnetic, optical, or other reading and/or writing system coupled to the processing unit, can be used for the memory.

The operator interface 36 may comprise one or more input devices, such as a keyboard, a touchscreen, and/or mouse, which may be used to input data, such as, although other types and/numbers of data systems and/or devices may be used. The display 38 may comprise any type of display system is used to show data and information to the user, such as a transaction status and result, although other types of data and information could be displayed and other manners of providing the information can be used. The display 38 comprises a display screen, such as an LCD screen by way of example only, although other types and/or numbers of displays could be used.

The mobile device 50 is a mobile computing device also configured to generate a secret key substantially simultaneously and independently with the fixed device 10 based on one or more shared characteristics, such as distance measurements between the fixed position device 10 and the mobile device 50, although other types and/or numbers of other systems and devices which can measure other characteristics, such as velocity, acceleration, or phase, phase-velocity or phase-acceleration by way of example, could be used. Since the structure and operation of systems which could be used to obtain a plurality of measurements of a shared characteristic between devices 10 and 50, such as distance or velocity, are well known to those or ordinary skill in the art, they will not be described in detail herein. By way of example only, a system for obtaining a plurality of distance measurements to a target which could be used herein is disclosed in U.S. Pat. No. 7,202,941, which herein incorporated by reference in its entirety.

Additionally, in this particular example the mobile device 50 is a smart phone device, although other types and/or numbers of fixed or mobile computing devices could be used. Additionally, in this particular example, the emissions used by the mobile device 50 to measure distance are optical, although other types and/or numbers of emissions could be used, such as acoustic or radio emissions by way of example only.

The mobile device 50 includes a housing 80 with a front face 42 which has a reflecting element 64, although the housing 80 could have other shapes and configurations. The reflecting element 64 is a white diffuse reflector and material on the front face 82 surrounding the reflecting element 24 is absorptive, although other types and/or numbers of reflecting elements and adjacent materials on front face 82 could be used and in other examples the inclusion of a reflecting element may be optional. The reflecting element 64 also may have beaded retroreflectors or prism-based retroreflectors which help with optical gain, although other types and/or numbers of elements which help with optical gain may be used.

The transmission system 54 includes an energy emitter 60 and a driver 58, although the transmission system may comprises other types and/or numbers of other components or other elements in other configurations. An input of the transmission system 54 is coupled to the output of a clock system 74 through a gate 58 circuit where the clock system 74 and gate 56 are configured to generate an emission waveform, such as a burst waveform. In the transmission system 54, the emission waveform may be amplified by the driver 58 and transduced from an electronic signal to emitted energy (not shown in FIG. 1) by the energy emitter 60. The energy emitter 60 transmits the emitted energy in a defined envelope or cone to reduce the probability of interception, although other types and/or numbers of emission paths could be used. The emitted energy is transmitted towards another device, such as the fixed device 10 in this example, for minimizing an error condition with the generation of the bits of the keys to establish secure communications. In this particular example, the energy emitter 60 comprises one or more of LEDs, such as one or more superluminescent diodes, or laser diodes which transmit optical radiation, although other types and/or numbers of energy emitters could be used which emit other emissions in other frequencies of electromagnetic energy, such as RF by way of example. In the example where the energy emitter 60 is configured to emit RF, then the energy emitter 60 comprises an antenna, although other types of emitters may be used. By way of example only, other types of emissions may also be used, such as acoustic, magnetic, electrostatic, or a hybrid of two or more of these. If electromagnetic energy is used, the carrier can be either in the radio frequency (RF) portion of the spectrum or in the millimeter-wave (MMW), microwave, infrared (IR), visible, or ultraviolet (UV) energy.

In this particular example, the clock system 74 and gate 56 are coupled to the digital processing system 52 and generate a burst waveform modulation of emitted energy which is transmitted to the driver 58 and output by the energy emitter 60, although other types and/or numbers of systems, devices, components and/or elements may be used to manage the generation of the emissions.

The reception system 84 includes a receiver 68 and an amplifier 70, although the reception system 84 may comprise other types and/or numbers of other components or other elements in other configurations. In this particular example, the receiver 28 is positioned to receive at least a portion of the emission which is amplified by the amplifier 70, although the reception system 84 may be configured in other manners. In this particular example, the receiver 68 comprises PN, PIN, or APD photodiodes to receive electromagnetic radiation in the optical spectrum, although the receiver 68 may comprise other types and/or numbers of receiving elements and/or other types of emissions could be received. By way of example only, if the received radiation is RF, then the receiver 68 may be an antenna. An output of the reception system 84 is coupled to a sampling system 72, although other configurations may be used.

The sampling system 72 receives and samples the amplified emissions from the reception system 84 which are used for the substantially simultaneously and independently generated secret keys based on measurements of one or more common or shared characteristics between two devices, such as the fixed device 10 and mobile device 50 in this example. The sampled amplified emissions from the sampling system 72 are transmitted to the digital processing system 52. Although in this example a separate transmission system 14 and reception system 44 are shown, other types and/or numbers of systems or devices may be used, such as a transceiver system by way of example.

The digital processing system 52 is coupled to and controls the operations of the gate 56, sampling system 72, clock system 74, the transmission system 54, and the reception system 84, although other types and/or numbers of processing systems coupled to other types and/or numbers of systems, devices, components, or other elements in other configurations could be used. The digital processing system 52 includes a processing unit and a memory which are coupled together, although the digital processing system 52 can have other types and/or numbers of systems, devices, components, or other elements in other locations and configurations. For example, an operator interface 76 and a display 78 are coupled to the digital processing system 52, but in other examples could be part of the digital processing system 52.

The memory stores programmed instructions and data for execution by processing unit for minimizing an error condition with the generation of one or more secret keys as described and illustrated by way of the examples herein, including: synchronizing with a mobile device configured to execute a corresponding key generation process; converting data obtained based on at least one shared characteristic with the synchronized mobile device into a plurality of binary numbers; determining, by the computing device, a subset of bits from a set of bits for each of the plurality of binary numbers which are measurably random; detecting an error with any of the subsets of one or more bits for each of the plurality of binary numbers; selecting at least one of the subsets of one or more bits for the plurality of binary numbers without the detected error; and generating a key based on the selected at least one of the subsets of one or more bits for the plurality of binary numbers for use in securing communications with the synchronized mobile device, although other types and/or numbers of instructions and data can be stored and executed and some or all of these instructions and data may be stored elsewhere. A variety of different types of memory storage devices, such as a random access memory (RAM), a read only memory (ROM), hard disk, CD ROM, DVD, or other computer readable medium which is read from and/or written to by a magnetic, optical, or other reading and/or writing system coupled to the processing unit, can be used for the memory.

The operator interface 76 may comprise one or more input devices, such as a keyboard, a touchscreen, and/or mouse, which may be used to input data, such as, although other types and/numbers of data systems and/or devices may be used. The display 78 may comprise any type of display system is used to show data and information to the user, such as a transaction status and result, although other types of data and information could be displayed and other manners of providing the information can be used. The display 78 comprises a display screen, such as an LCD screen by way of example only, although other types and/or numbers of displays could be used.

Although in this particular example, the system 2 comprises the fixed position device 10 and the mobile device 50, the system 2 could comprise other types and/or numbers of other systems, devices, components or other elements in other configurations. By way of example only, multiple fixed position devices 10 and multiple mobile devices 50 could be arranged in a network configuration over which secure digital information is transmitted using the one or more secret keys generated with an error condition minimized in accordance with examples of this technology.

Although an exemplary fixed position device 10 and a mobile device 50 are described and illustrated herein, at least portions of these devices, such as digital processing systems 12 and 52, can be implemented on any suitable computer system or computing device, programmable logic device, application specific integrated circuit, and the like. It is to be understood that the devices and systems of the examples described herein are for exemplary purposes, as many variations of the specific components, hardware and software used to implement the examples are possible, as will be appreciated by those skilled in the relevant art(s).

Furthermore, at least portions of each of the devices of the examples may be conveniently implemented using one or more general purpose computer systems, microprocessors, digital signal processors, micro-controllers, and the like, programmed according to the teachings of the examples, as described and illustrated herein, and as will be appreciated by those skilled in the computer and software arts.

In addition, two or more computing systems or devices can be substituted for at least portions of the devices in any example of this technology. Accordingly, principles and advantages of distributed processing, such as redundancy, replication, and the like, also can be implemented, as desired, to increase the robustness and performance of at least portions of the devices. Example of this technology may also be implemented on computer system or systems that extend across any suitable network using any suitable interface mechanisms and communications technologies, including by way of example only telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, and combinations thereof.

At least portions of examples of this technology may also be embodied as a computer readable medium having instructions stored thereon for managing windows within an Internet browser window, as described herein, which when executed by a processor, cause the processor to carry out the steps necessary to implement at least portions of the methods of examples of this technology, as described and illustrated.

A method for minimizing an error condition when generating one or more keys will now be described with reference to FIGS. 1-8. Examples of this technology substantially simultaneously and independently minimizes an error condition with the generation of secret keys based on measurements of one or more common or shared characteristics between devices 10 and 50. By way of example, the error condition may be an actual detected error or a possible error, e.g. an issue with a selected bit below a set accuracy threshold. The key bits are advantageously never communicated between the two devices but instead are independently generated and are identical.

Figure 2:
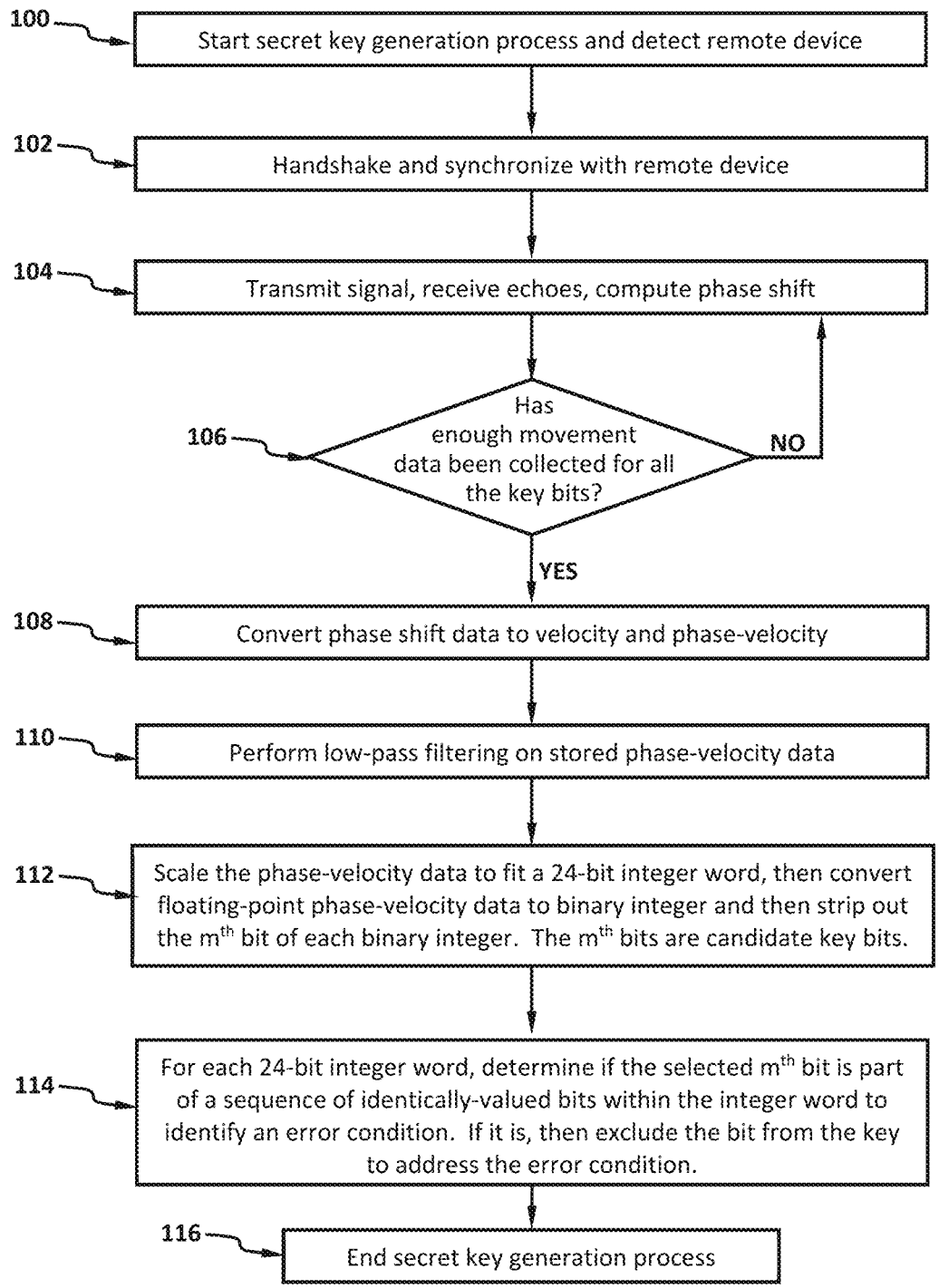
FIG. 2 is a flowchart of a method for substantially simultaneously and independently minimizing an error condition with the generation of secret keys based on measurements of one or more common or shared characteristics at two or more devices.
Figure 7:
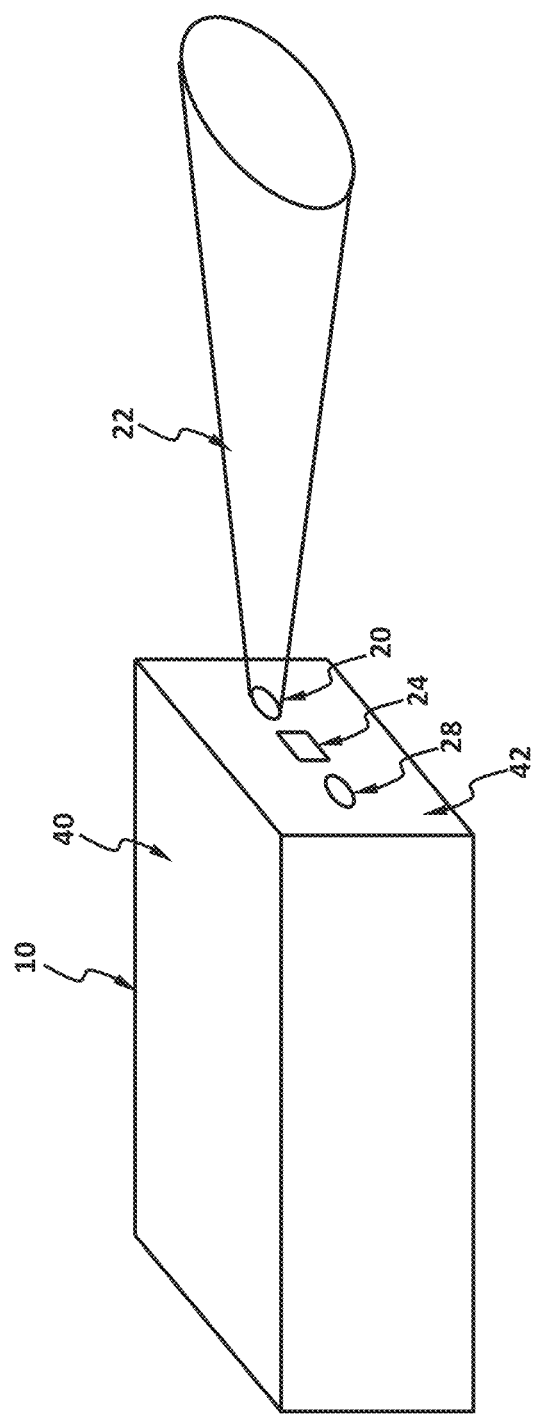
FIG. 7 is an isometric view of an example of a first device.

Referring to FIG. 2, an example of a method for substantially simultaneously and independently minimizes an error condition with the generation of secret keys based on measurements of one or more common or shared characteristics is illustrated. In step 100 the secret key generation process commences, and can comprise the fixed position device 10 using energy emitter 20 in the transmission system 14 periodically sending out a probe signal to identify the presence of a mobile device 50, although other manners for identifying the presence of device 50 with respect to device 10 can be used, the probe signal can be sent in other manners, such as randomly, and the mobile device 50 could send probe signals to identify the presence of the fixed device 10. When the probe signal strikes a reflecting element 64 on a front face 82 of a mobile device 50 or some other surface in other examples, at least a portion of the probe signal may be reflected back, as reflected energy 26, towards the receiver 28 in the reception system 44, although other manners for signaling the presence of the mobile device 50, such as having the mobile device 50 transmit a new signal using the energy emitter 60 in the transmission system 54 upon receipt of a probe signal by the receiver 68 in the reception system 84.

The probe signal and/or the response to the probe signal may need to be enabled by a user at one of the devices 10 or 50. This enabling, or authentication, can be accomplished by the act of entering in a password, PIN number, voice activation, by activating a switch, or by the use of a biometric characteristic of the user such as a thumb or fingerprint scan, or eye-scan, although other authentication techniques could be used.

Also in step 100, the fixed position device 10 using receiver 28 in reception system 44 monitors for a reflected probe signal, although the receiver 28 could monitor for other types of signals, such as a new response signal to a probe signal. If a reply to probe signal is received, then digital processing system 12 determines if the signal strength of the reply to the probe signal is adequate by comparing the amplitude of the reply signal to a threshold stored in memory in digital processing system 12, although other manners for determining if there is adequate signal strength can be used and other ways of obtaining the threshold can be used. In this particular example, the digital processing system 12 determines the amplitude of the reply signal using a Discrete Fourier Transform, although other manner for determining the amplitude or signal strength can be used. With some locations and positions of the fixed position device 10 with respect to the mobile device 50, the signal strength may not be adequate to obtain suitable measurements of one or more shared characteristics, such as the distance between the devices 10 and 50 over a period of time or the velocity of one or more of the devices 10 and 50 over a period of time. By way of example, if the front faces 42 and 82 of devices 10 and 50, respectively, are not substantially facing one another, the emission cones from one or both devices 10 or 50 may not illuminate or poorly illuminate, the opposing surfaces, particularly the reflecting element 64 or 24, or a receiver 28 or 68. If the signal strength does not exceed the threshold, then the devices do not proceed to a synchronization mode of operation (i.e., in this example do not proceed to step 102) but may instead remain in a probing mode of operation in step 100.

In step 102, the fixed position device 10 and the mobile device 50 conduct handshake and synchronization operations such that the necessary timing of forthcoming signaling and processing operations can be established. Since techniques for handshaking and synchronization between devices are well known to those of ordinary skill in the art, they will not be described in detail herein.

Figure 8:
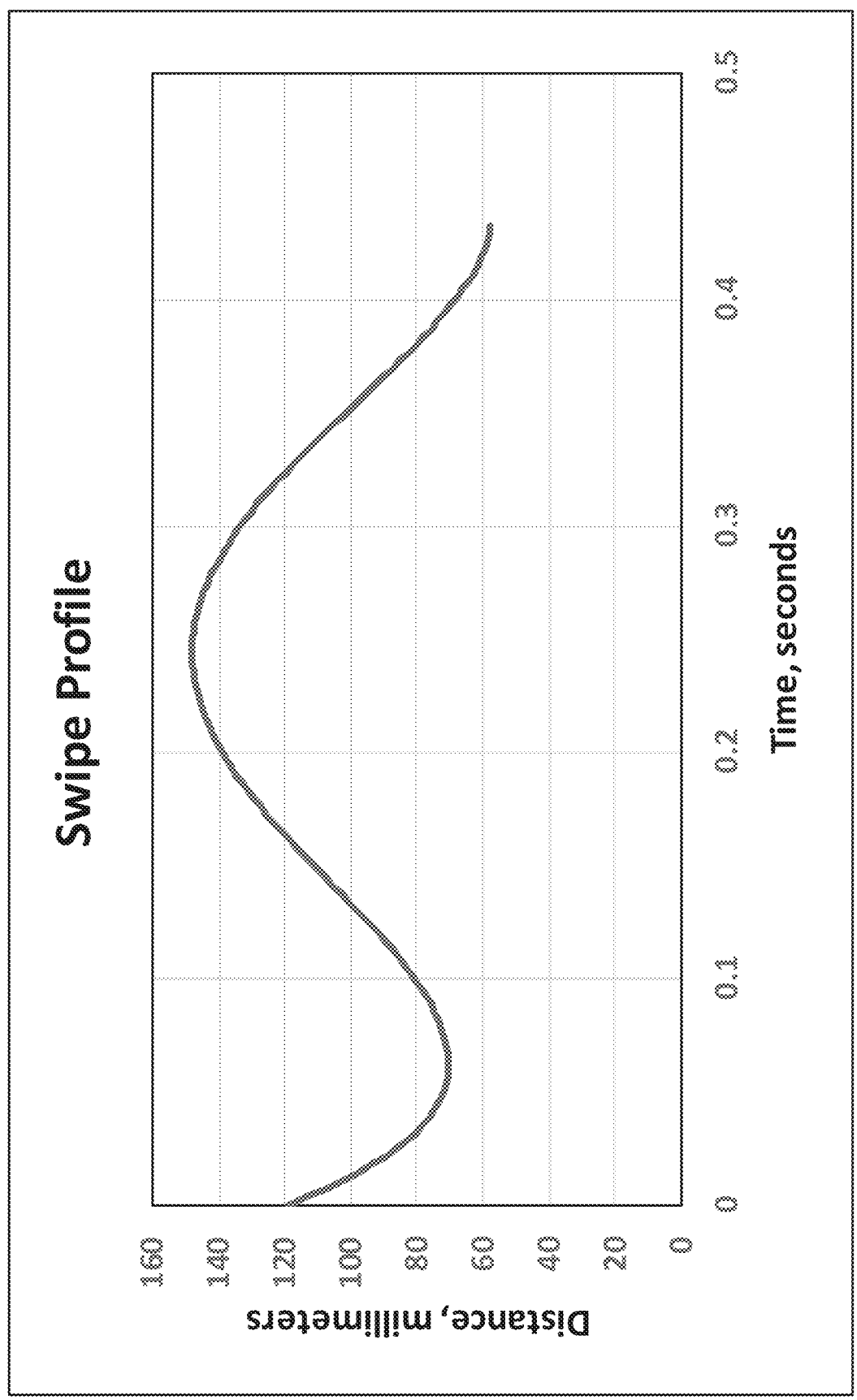
FIG. 8 is a graph of an example of a distance between a first device and a second device as a function of time during a swipe.

In step 104, the separation distance between devices 10 and 50 is measured by each of the devices 10 and 50 over a period of time during one or more swipes or passes of mobile device 50 past fixed device 10, such as the distance-vs-time swipe profile illustrated in FIG. 8, although other types and/or numbers of shared characteristics between the devices 10 and 50 could be measured, such as velocity. By way of example, mobile device 50 will emit energy from energy emitter 60 directed at the front face 42 of fixed device 10 including the reflecting element 24 which will backscatter energy towards front face 82 including receiver 68 of mobile device 50 as illustrated in FIG. 1. If in a half-duplex mode of operation, then when device 50 is not actively measuring the separation distance or change in distance between the devices, then energy emitter 20 of fixed device 10 will emit energy 22 directed at the front face 82 of mobile device 50 including the reflecting element 64 which will backscatter energy towards the front face 42 including receiver 28 of fixed device 10. Accordingly, in this half-duplex example the burst emissions alternates between the devices 10 and 50, and are used for measuring the shared or common distance or velocity between the devices 10 and 50 during the swipe. As illustrated by this example, the devices 10 and 50 need to be arranged in a geometry where the front faces 42 and 82 are substantially facing each other, although other manners for obtaining the measurements in other orientations could be used. Alternately in a full-duplex mode of operation, both fixed device 10 and mobile device 50 are emitting energy and measuring the shared or common distance or velocity concurrently at the same time, continuously, which is possible if, for example, the frequency or wavelength of the energy emission 22 of the fixed device 10 is substantially different than the frequency or wavelength of the energy emission of the mobile device, as will be discussed in greater detail below.

Typically, a half-duplex emission is a burst comprising a periodic amplitude-modulated emission from the energy emitters 20 and 60 in devices 10 and 50, respectively. The modulation waveform during the burst can be sinusoidal, square wave, or any other periodic waveform, although other types of emissions could be used, and there is substantially no energy emission during the times between the bursts.

To determine the shared or common distance between the devices 10 and 50, the processing systems 12 and 52 may use data from the energy emitters 20 and 60 and the receivers 28 and 68 in devices 10 and 50, respectively, look at the change in phase between the emitted signal and the received signal. The distance can be computed by the processing system 12 and 52 using the formula $d=\lambda\phi/4\pi$, where d is the distance, $\lambda$ is the wavelength of the modulation frequency (e.g., $\lambda$=3 meters for a modulation frequency of 100 MHz), and $\phi$ is the phase shift between the received and transmitted signals. The phase shift measurement can be performed with conventional quadrature detection methods, or by methods and systems taught in U.S. Pat. No. 7,202,941, which is herein incorporated by reference in its entirety. Note that d is proportional to the phase shift $\phi$ and the value of $\phi$ can be used as a proxy for the distance d. Indeed, in the examples illustrated herein, especially in connection with the tables in FIGS. 3-6, the phase shift $\phi$ will be the basis signal from which the secret keys are independently generated at each device instead of distance, although other approaches may be used. Furthermore the relative velocity, or the change in phase shift $\phi$ which can be thought of as a Phase Velocity, (i.e., the time rate of change of phase) of device 50 with respect to device 10 can be measured by directly measuring the Doppler shift of the received echo in digital processing systems 12 and 52, although the Phase Velocity can be computed as the difference between two phase values divided by the time between them as discussed further below. Alternately, the burst can be truncated such that only one half-cycle of modulation is transmitted, which is a pulse, whose round-trip travel time can be determined with conventional pulse-time-of-flight distance measuring methods. In this case the distance is $d=ct/2$, where c is the speed of light, and t is the round-trip propagation time of the pulse. Note that d is proportional to the round-trip time t, and in the PTOF case the value of t can be used as a proxy for the separation distance d.

Additionally, although in these particular examples the methods of measuring distance or velocity described herein entail measuring the round-trip time of flight of energy from the emitting device, to the reflecting device, and back to the emitting device, other techniques can be used. For example, a unidirectional technique for measuring distance or velocity in which the measuring energy flows from one device to another and not back to the originating device, can have lower implementation costs and a simplified electronic architecture and processing algorithm, although certain requirements on the electronic components in these devices may exist, such as high stability in the electronic clocks.

During step 104 the mobile device 50 may be moved along in a swiping motion by fixed position device 10, although other arrangements may be used, such as the device 10 could move with respect to device 50 or both devices 10 and 50 could be moving. This unique change in position for each swipe or pass of device 50 by device 10 results in a changing separation distance, such as that illustrated in FIG. 8, for example, between devices 10 and 50 which is used for the generation of secret keys. This swipe, in which device 50 moves past device 10 just once, will in general have a varying distance between the devices such that the start and end distances of the swipe are greater than a mid-swipe distance. This change in distance over time also results in a varying phase velocity between the devices 50 and 10 as well. Although device 50 is shown moving and device 10 is fixed, again other configurations can be used, such as having device 10 moving with respect to device 50 or both devices 10 and 50 moving with respect to each other. Note that it is extremely unlikely that any two swipes will be identical, let alone similar, owing to the user-induced variations of motion of the device 50.

Also in Step 104, the processing systems 12 and 52 in devices 10 and 50, respectively, can determine if one or more of the averaged distance measurements are less than a predetermined threshold distance. This step is optional and provides a safeguard to prevent long-distance swipes or passes of a device 50 with respect to a device 10 which are impractical and typically arise from a person trying to surreptitiously exchange data with one of the devices 10 or 50. For most applications the maximum distance between the fixed position device 10 and a mobile device 50 is less than ten to twelve inches (300 mm), although other distances could be used and these distances can be stored in memory in the processing systems 12 and 52, respectively. Distances in excess of this predetermined threshold would be immediately invalidated by the processing systems 12 and 52, respectively.

In step 106, the processing systems 12 and 52 in devices 10 and 50, respectively, determine if enough measurements of the distance between devices 10 and 50 as mobile device 50 travels along a swipe path have been obtained to generate 128 key bits, although other numbers of key bits with other requirements for obtained data could be used. Typically, the sequence of key bits required by many popular encryption methods is 128 bits, although again other numbers of key bits could be used depending on the desired degree of data security, such as 256 bits, or even 1024 bits or more by way of example. Additionally, typically in most distance and/or velocity measuring devices that operate in an open medium, such as air or free space, stray and ambient signals, such as radio frequency interference in the RF spectrum, or stray light in the visible spectrum, will create electronic noise that reduces the precision of the distance or velocity measurement. To offset this problem, the distance or velocity measurements can be made over multiple bursts which are then averaged together to improve the measurement precision. This can result in several thousand bursts being transmitted by the energy emitters 20 and 60 in each of the device 10 and 50, respectively, during a swipe of device 50 by device 10.

By way of example only, a typical burst modulation frequency is 100 MHz, and typically there are 100 cycles of this modulation per burst, such that each burst lasts 1 μs. Given that one phase, distance, or phase velocity measurement can occur during one burst and that in 0.5 seconds there can be 250,000 (half-duplex) emission bursts for each of the devices 10 and 50, then 250,000 measurements can be made in 0.5 seconds. If 250 key bits are needed, then sets of 1,000 measurements can be averaged together by the processing systems 12 and 52 in the devices 10 and 50, respectively, to improve the precision of the distance, phase, or phase-velocity measurement. As explained in greater detail herein, since one key bit is later obtained from each averaged measurement, greater precision for each average measurement for each of the devices 10 and 50 results in greater precision on each of the key bits.

Accordingly, if in step 106 the processing systems 12 and 52 in devices 10 and 50, respectively, determine enough measurements of the distance, phase, or phase-velocity between devices 10 and 50 have not been obtained to average, then the No branch is taken back to step 104 where additional distance measurements are taken, although again other types of shared characteristics between the devices 10 and 50 could be measured. If in step 106 the processing systems 12 and 52 in devices 10 and 50, respectively, determine enough measurements of the distance, phase, or phase-velocity between devices 10 and 50 have been obtained to average, then the Yes branch is taken to step 108.

In step 108, the processing systems 12 and 52 in devices 10 and 50, respectively, convert the averaged phase measurements to phase-velocity, although other conversions could be performed, such as converting distance to velocity or acceleration. Velocity or phase-velocity readings are generally used because most PTOF and phase-measuring distance measurements have a non-zero distance or phase offset that varies from device to device (i.e., the non-zero distance or phase offset of fixed device 10 will be different than the non-zero distance or phase offset of mobile device 50). This differing offset makes it difficult for two devices 10 and 50 to arrive at the same distance or phase measurement—even when the distance being measured is the same for each device—thus resulting in different bits for the secret key for the two devices 10 and 50. However, the computation of velocity or phase-velocity, being a time rate of change of distance or distance, respectively, inherently subtracts out the offset such that the "velocity offset" and "phase-velocity offset" is zero. As a result, bits generated from the velocity or phase-velocity readings obtained from the averaged distance measurements for the devices 10 and 50 will be identical. Although phase-velocity is preferred, other converted parameters, such as phase-acceleration, can be used to generate the bits for the one or more keys.

The phase-velocity is computed by the processing systems 12 and 52 in devices 10 and 50, respectively, as the difference between two sequential phase measurements divided by the time between them. The resulting phase-velocity, which is an instantaneous phase-velocity, is used to generate a key bit as explained in greater detail below. This division operation, in which the change in phase is divided by a constant differential time value, performed by the processing systems 12 and 52 in devices 10 and 50, respectively, is essentially a scaling operation since the differential time value is a constant. Since the change in phase between two sequential measurements can be small, not much larger than the residual noise level still present after the averaging process, the processing systems 12 and 52 in devices 10 and 50, respectively, will select phase measurements whose differential values are more likely to be greater. By way of example only, the processing systems 12 and 52 in devices 10 and 50, respectively, may select one averaged phase measurement obtained at the start of a swipe and one averaged phase measurement obtained 25% of the way through a swipe for the first key bit. Using non-sequential phases in the phase-velocity computation will result in a non-instantaneous phase-velocity quantity whose value will be much greater than the noise floors of receiver 28 and receiver 68.

Similarly, changes in phase-velocity can result in an acceleration quantity "phase acceleration" which also can be used by the processing systems 12 and 52 in devices 10 and 50, respectively, to generate the bits for the one or more secret keys. The phase-acceleration values used in the computation by the processing systems 12 and 52 in devices 10 and 50, respectively, can be adjacent values, giving rise to instantaneous acceleration or they can be non-adjacent as discussed above. In one advantageous example, the phase-velocity quantity, computed with non-adjacent phase values, will be used for key generation and will be assumed in the discussion and examples hereinafter.

In step 110, after a number of phase-velocity readings are computed from the phase measurements, the phase-velocity readings can be further filtered to reduce any residual noise effects by the digital processing systems 12 and 52 in devices 10 and 50, respectively. With the optional filtering, the one or more keys generated in one device 10 are even more likely to match the one or more keys generated by the other device 50 in this example. In this particular example, the filtering is a low-pass filter, such as a "box-car" average which is essentially a convolution function with unity coefficients, an IIR (infinite impulse response) or FIR (finite impulse response), whose width and coefficients can be determined, such that a desired filter function can be generated, although other types and/or numbers of filters could be used. Since the structure and operation of filtering systems are well known to those of ordinary skill in the art, they will not be described in detail here.

In step 112, the processing systems 12 and 52 in devices 10 and 50, respectively, multiples the floating-point real-valued phase-velocity data by a constant such that a binary representation of the phase-velocity data when truncated (i.e., converted to integer data type) has zero-valued bits in the most-significant one or two columns. Note that the constant, which is determined a priori, is the same at both devices 10 and 50. Next in step 112 a bit from each phase-velocity binary number is selected to include in the generated secret key, although other numbers of bits could be selected from other types and/or numbers of converted measurements, such as selecting a bit from a phase-acceleration for example.

An example of the generation of bits for the one or more secret keys by the processing systems 12 and 52 in devices 10 and 50, respectively, will now be described with reference to an example shown in FIG. 3 through 6. Referring more specifically, to FIGS. 3 and 4, the processing systems 12 and 52 in devices 10 and 50, respectively, convert the averaged and filtered phase measurements into the columns in this table. Columns 90F and 90M denote the particular number of the averaged and filtered phase measurement at the fixed device 10 and mobile device 50, respectively; columns 92F and 92M are the associated distance of the swipe (in millimeters) at the fixed device 10 and mobile device 50, respectively (columns 92F and 92M are included for reference); columns 94F and 94M are the associated phases of the swipe (in radians) at the fixed device 10 and mobile device 50, respectively; columns 96F and 96M are the associated phase-velocities of the swipe (in radians per second) at the fixed device 10 and mobile device 50, respectively, in floating point format; columns 98F and 98M are the scaled associated phase-velocities of the swipe (in radians per second) at the fixed device 10 and mobile device 50, respectively, in an integer format; and columns 100F and 100M are the scaled phase-velocities of the swipe (in radians per second) at the fixed device 10 and mobile device 50, respectively, in a binary format or representation.

In FIGS. 2 and 3 the data associated with secret key bits 40 through 90 (as indicated by columns 90F and 90M) are presented. The raw data, which is the phase data of columns 94F and 94M, are generated by phase measuring means as described in, for example, U.S. Pat. No. 7,202,941. Note that the phase entries in column 94F are similar, but not identical, with the phase entries of column 94M due to random noise in the receivers 44 and 84 and differing phase offsets as described above. The Phase-Vel columns, 96F and 96M, are computed according to the formula PhaseVel[k]=90,000×($\phi$[k]−$\phi$[k−32])/(0.5×NmrKeyBits), where 90,000 is the scaling factor and the total number of key bits, NmrKeyBits, is 142. The factor of 0.5 accounts for half-duplex operation, and the factor of 32 in the phase index means that the phase samples for the phase-velocity computation are 32 samples apart. As an example of the calculations refer for the moment to column 94F, for a Key Bit Number=k=72, $\phi$[72]=0.619696, $\phi$[72−32]=$\phi$[40]=0.431226, and PhaseVel[72]=4,817,466.63, which after filtering results in the Phase-Vel value of 4,810,022.283 in column 96F at Key Bit # of 72. Next, still in Step 112 of FIG. 2, the floating point Phase-Vel value of 4,810,022.283 in column 96F is simply truncated to yield an integer value of 4,810,022 in column 98F, and the integer value of 4,810,022 is reformatted in a binary representation in column 100F.

In this particular example, the digital processing systems 12 and 52 in devices 10 and 50, respectively, determine that the bits fall into four different categories based on stored data which identifies which columns are measurably random and unaffected by noise based on the number of bits and sample sizes, although other manners for separating the bits into other types and/or numbers of categories can be used. The least significant bits in the columns in section 108F and 108M are dominated by random noise that survived the filtering and averaging processes and have values that are likely to be different between the devices 10 and 50. At the other extreme, the most significant bits in the column in section 102F and 92M are all zero, resulting from a relatively low phase-velocity between the devices 10 and 50. In this example, the bits in section 102F and 92M are not measurably random and cannot be used for generating the one or more keys. Next, the columns in section 104F and 94M are bits that are both zero and one but are still not measurably random as they have strong serial correlation and thus cannot be directly used for generating the one or more secret keys. Next, the columns in section 106F and 96M lie above the noise, are non-correlated and measurably random, and are known to both devices 10 and 50. Next, the processing systems 12 and 52 in devices 10 and 50, respectively, selects the bits from this column to generate the one or more secret keys. Accordingly, the bits in bit column 18 for both devices 10 and 50 will be independently developed without transmitting the secret key or keys between the devices 10 and 50 and the secret key or keys will be identical at devices 10 and 50. In this example, the bits in column 18 can now be used by the devices 10 and 50 as the secret key for applications, such as encrypting and decrypting data sent between devices 10 and 50 or providing for secure message integrity checks on data transmitted between devices 10 and 50 in manners well known to those of ordinary skill in the art.

Figure 5:
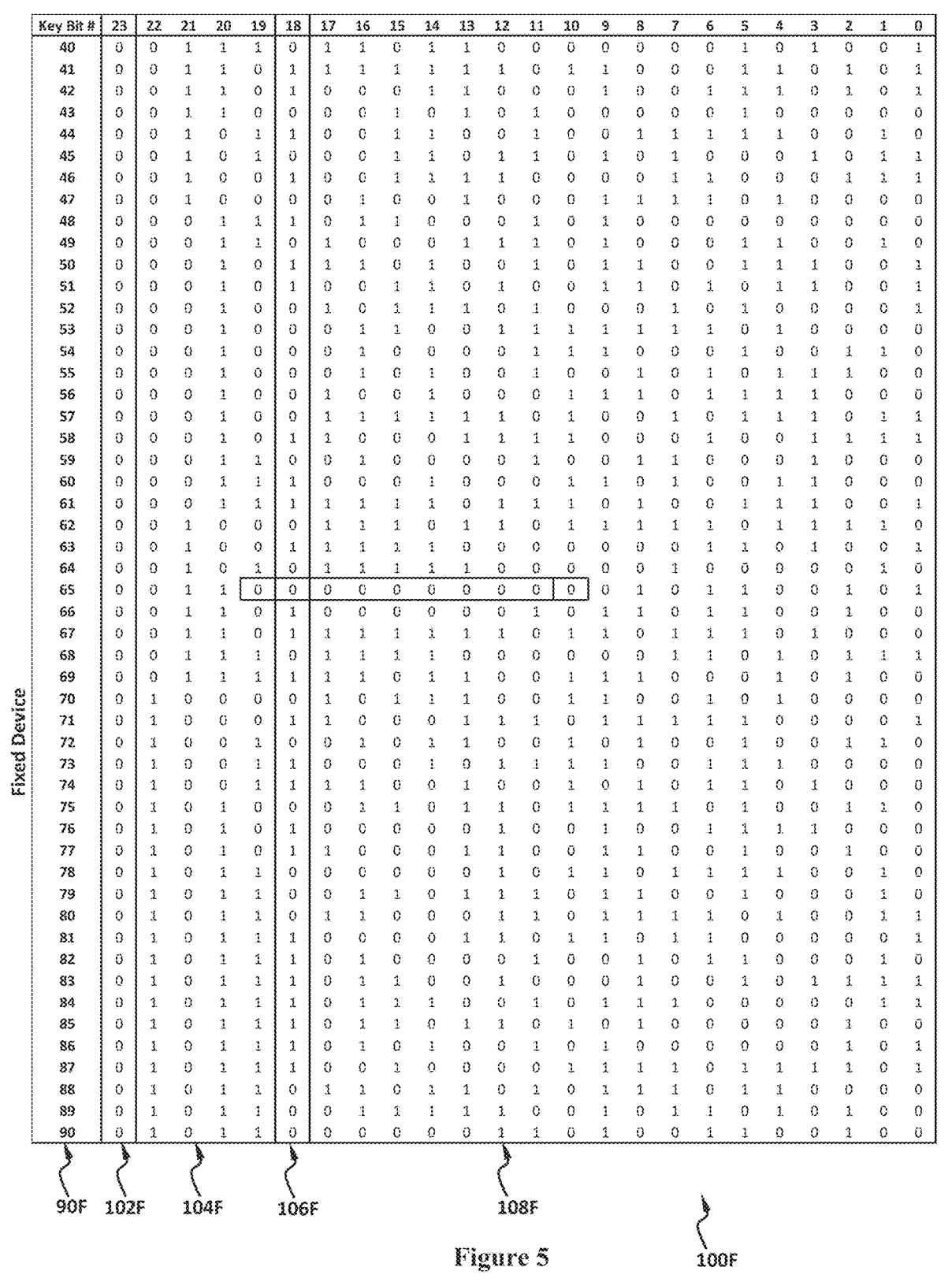

In other words, column 100F of FIG. 3 is reproduced and expanded in the table of FIG. 5, in which column 100F has been split into column 102F (bit column 23) whose values are the most-significant values of the integer number, and are all identically zero; column 104F whose columnar values (bit columns 22 through 19) suffer from serial correlation and are therefore not measurably random and are therefore unsuitable for use as key bits; column 106F whose values in bit column 18 are measurably random and are largely unaffected by lower-order bit noise and are therefore are suitable for use as key bits; and column 108F whose columnar values (bit columns 17 through 0) are measurably random, but are heavily influenced by noise and therefore are not suitable for use as key bits because the bits in this region are unlikely to match between the devices 10 and 50 because of the noise. Indeed, the bits in column 106F in FIG. 5 produced by fixed device 10 are very likely to match the bits in column 106M in FIG. 6 produced by mobile device 50 as they are well above the noise floor of devices 10 and 50, are measurably random, and are suitable for use as secret key bits for encrypting and decrypting communications between devices 10 and 50.

However, upon close inspection and a comparison of the key bits of column 106F and 106M it is seen that all of the bits match with one exception: the bit associated with Key Bit #65 which is a '0' for the fixed device 10 (in this example) and a '1' for the mobile device. The source of the mismatch between these keys bits can be traced to bit column 10 of Key Bit 65 in FIG. 6, which is a '1' for the mobile device and has a sequence of identically-valued '1's to its left (i.e., the higher-ordered vales). Being in column 10 the bit is susceptible to noise, and if, for example, an integer noise value of 1024 is added to the phase-velocity value of 3,144,886 then all of these '1's will change value to '0', including the bit in this row that is part of the key bits. So, due to noise, it appears that this exemplary value of 1024 was added to the phase-velocity value of the fixed device (bits 10 through 19 are all identically zero for Key Bit #65 in FIG. 5) but it was not added to the phase-velocity value of the mobile device (bits 10 through 19 are all identically one for Key Bit #65 in FIG. 6). The detection and correction of this phenomenon or error condition occurs in Step 114 of FIG. 2. The detection of potential mismatching key bits is to inspect the bits to the immediate right (i.e., to the lower orders) and determine if the candidate key bit is a member of a sequence of identically valued bits, such as is the case for bits 10 through 19 for Key Bit #65 for both the fixed device 10 (all 0's) and mobile device 50 (all 1's). Once the sequence of identically-valued bits is detected the Key Bit # can be flagged such that the candidate key bit (Key Bit #65 in the example cited) is excluded from use as a secret key bit. For detection purposes, a key bit can be excluded if the sequence of identically-valued bits is greater than five bits in length. Note that this exclusion process applies equally well to both devices, and regardless of whether a sequence is a sequence of 1's or a sequence of 0's. Note further that this detection and exclusion process of this phenomenon or error condition comprising an error or a possible error, e.g. an issue with a selected bit below a set accuracy threshold, which is executed by digital processing systems 12 and 52 within devices 10 and 50, respectively, is one of the advantages of these examples of the technology.

Excluding one or more bits in the above manner from use as a secret key bit necessitates the use of generating additional secret bits to use as 'spares' to replace those that might be excluded. In practice this just means obtaining additional key bits by slightly lengthening the duration of a swipe, and appending these additional key bits to the end of the sequence of key bits. Obtaining an additional number of key bits whose number is 10% the length of the desired key length provides an adequate number of spare key bits. For example, if the desired secret key length is 128 bits, then an extra 13 bits (for a total of 141 candidate key bits) will provide a safe margin in case up to 13 key bits are detected to have probable mismatch errors.

Next in Step 116 of FIG. 2, the key generation process, being complete at each device, terminates at each device, with the generated secret keys being stored in memory at each device 10 and 50 for use in encrypting and decrypting messages to be sent between device 10 and 50. By way of example only, other variations of this technology are provided below.

Full-Duplex: Although in the half-duplex example the energies are sequentially emitted by energy emitter 20 and energy emitter 60 from devices 10 and 50 respectively, such that the energy emissions do not occur at the same time, other methods can be used. For example, if the energies emitted by energy emitter 20 and energy emitter 60 of devices 10 and 50 are different, such as electromagnetic energy of differing emission wavelengths, then devices 10 and 50 can emit energy simultaneously (i.e., in a full-duplex mode) to measure the swipe profile or exchange data, so long as adequate filtering is provided at the receivers 28 and 68 of devices 10 and 50, respectively, to prevent the direct reception of the emission of the opposing device.

Superluminescent light emitting diode (SLED) and f≥100 MHz: It was noted above that energy emitter 20 and energy emitter 60 can emit optical energy, such as visible light or infrared light, and as such energy emitter 20 and energy emitter 60 can be an LED (Light Emitting Diode) or a laser. However, energy emitter 20 and energy emitter 60 can instead be a SLED which can be beneficially modulated at higher frequencies than an LED, such as 100 MHz or greater, yet not present an ocular hazard, as in the case of a laser emission, to the user. Higher modulation frequencies beneficially create higher phase-velocity values and thereby improve the robustness of the key generation process.

Multiple columns: It was noted above that the bits are selected from a single column (i.e. bit column 18 in FIGS. 5 and 6) for use as secret key bits. However it was also noted that there are additional columns (containing higher-order more-significant bits, i.e. to the left of column 18) whose bits also are not directly influenced by noise. However, these additional columns are also not measurably random. Nonetheless, it is possible to combine these additional columns and generate additional key bits, or combine them with key bits generated as described in previous columns and increase their randomness. One way to combine them is logically, for example, by executing an exclusive OR function between amongst the bits. Another way is to simply sum the bit values of these additional columns, for each Key Bit, and discard all but the least-significant bit of the sum (i.e., use only the least significant bit of the sum as the secret key bit), and generate a sequence of bits that are measurably random and suitable for use as secret key bits. For example, for Key Bit #40, bit columns 22 through 19 can be added together to yield 0+1+1+1=3, which is 11 binary, resulting in a '1' key bit after the most-significant bit '1' bit is discarded.

Swipe profile: To this point the movement of a mobile device 50 with respect to a fixed device 10 has been described as a swipe, although other movement profiles are possible as well. Indeed, a swipe motion is thought of as a side-to-side motion (or up-down) although the motion profile for generating secret key bits can also be an "in-out" or "forward-back" motion as well. Taking this "in-out" or "forward-back" motion to a an extreme, the motion can terminate at one end of the "in-out" or "forward-back" when the mobile device 50 comes into physical contact with the fixed device 10, and the terminus can be thought of as a "tap". As such, the relative motion of the devices 10 and 50 can constitute one or more taps of the mobile device 50 against the fixed device 10.

NFC: To this point, in the provided examples the emitted energy 22 emitted by energy emitters 20 and 60 of devices 10 and 50, respectively has been described as being an optical emission, a radio emission (such as RF, VHF, UHF, etc.), or acoustic, magnetic, electrostatic, or a hybrid of two or more of these. In particular, NFC (Near Field Communications) is a protocol that utilizes magnetic inductive coupling for communicating data between devices 10 and 50. Note that the methods taught in this disclosure, for generating secret key bits and detecting and removing possible error bits from the key, can be used to secure an NFC-based communications link between devices 10 and 50.

Use same diode for transmission (TX) and reception (RX) with a TX/RX switch: In yet another example for secret key generation at two devices, the methods for key generation disclosed in US Patent Application Publication No. 2013/0236007, now abandoned, but included herein in its entirety, can be utilized except the energy communicated between the devices is not radio, but is instead optical. As such the antennae associated with US Patent Application Publication No. 2013/0236007 is replaced by a semiconductor junction diode, such as a GaAs, AlGaAs, or InGaAs diode, which is known to be able to transduce electronic energy flowing through it into an optical emission and is also able to transduce an optical emission incident upon it into an electrical signal. The optical emissions and signals are modulated at a radio frequency, and the electronic signals are similarly modulated and are equivalent to the signals input to or output by the antennae in US Patent Application Publication No. 2013/0236007, and as such all the mathematical processes and methods disclosed in US Patent Application Publication No. 2013/0236007 apply to an example in which the antennae are replaced by PN junction diodes.

Accordingly, as illustrated herein examples of this technology provide an effective and secure method and system for substantially simultaneously and independently minimizing an error condition with the generation of one or more secret keys for encrypting and decrypting data sent between devices based on measurements of one or more common or shared characteristics. Examples of this technology also are effective and secure methods for substantially simultaneously and independently minimizing an error condition with the generation of one or more secret keys that provide for secure message integrity checks on data transmitted between devices. These generated secret keys can be used in standard cryptographically-secure communication schemes

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
    synchronizing, by a computing device, with a mobile device configured to execute a corresponding key generation process;
    converting, by the computing device, data obtained based on at least one shared characteristic with the synchronized mobile device into a plurality of binary numbers;
    determining, by the computing device, at least one bit for each of the plurality of binary numbers which are at least measurably random;
    identifying, by the computing device, an error condition with any of the determined bits for the plurality of binary numbers;
    selecting, by the computing device, at least a portion of the determined bits for the plurality of binary numbers without the detected error condition; and
    generating, by the computing device, a key based on the selected determined bits for the plurality of binary numbers for use in securing communications with the synchronized mobile device.

2. The method as set forth in claim 1 wherein the shared characteristic comprises movement of the synchronized mobile device.

3. The method as set forth in claim 2 wherein the movement of the synchronized mobile device has a set identifiable terminus.

4. The method as set forth in claim 2 further comprising:
    measuring, by the computing device, the movement of the synchronized mobile device with use of an emission provided by a superluminescent diode and modulated to at least 100 MHz.

5. The method as set forth in claim 1 wherein the detecting the error condition further comprises detecting the error condition when any of identified bits for each of the plurality of binary numbers has an adjacent sequence of identically valued bits.

6. The method as set forth in claim 5 wherein the sequence of the identically valued bits comprises five or more of the identically valued bits.

7. The method as set forth in claim 1 wherein the selecting further comprises:
    selecting one or more additional bits for each of the plurality of binary numbers which are not measurably random; and
    combining the selected one or more additional bits, wherein the generating the key is further based on the combined selected one or more additional bits.

8. A non-transitory computer readable medium having stored thereon instructions comprising executable code which when executed by one or more processors, causes the one or more processors to:
    synchronize with a mobile device configured to execute a corresponding key generation process;
    convert data obtained based on at least one shared characteristic with the synchronized mobile device into a plurality of binary numbers;
    identify at least one bit for each of the plurality of binary numbers which are at least measurably random;
    detect an error condition with any of the determined bits for the plurality of binary numbers;
    select at least a portion of the determined bits for the plurality of binary numbers without the detected error condition; and
    generate a key based on the selected determined bits for the plurality of binary numbers for use in securing communications with the synchronized mobile device.

9. The non-transitory computer readable medium as set forth in claim 8 wherein the shared characteristic comprises movement of the synchronized mobile device.

10. The non-transitory computer readable medium as set forth in claim 9 wherein the movement of the synchronized mobile device has a set identifiable terminus.

11. The non-transitory computer readable medium as set forth in claim 9 wherein the executable code when executed by the one or more processors further causes the one or more processors to:
    measure the movement of the synchronized mobile device with use of an emission provided by a superluminescent diode and modulated to at least 100 MHz.

12. The non-transitory computer readable medium as set forth in claim 8 wherein for the detecting the error condition, the executable code when executed by the one or more processors further causes the one or more processors to:
 detect the error condition when any of identified bits for each of the plurality of binary numbers has an adjacent sequence of identically valued bits.

13. The non-transitory computer readable medium as set forth in claim 12 wherein the sequence of the identically valued bits comprises five or more of the identically valued bits.

14. The non-transitory computer readable medium as set forth in claim 8 wherein for the select, the executable code when executed by the one or more processors further causes the one or more processors to:
 select one or more additional bits for each of the plurality of binary numbers which are not measurably random; and
 combine the selected one or more additional bits, wherein the generating the key is further based on the combined selected one or more additional bits.

15. A computing device comprising a memory comprising programmed instructions stored thereon and one or more processors configured to execute the stored programmed instructions to:
 synchronize with a mobile device configured to execute a corresponding key generation process;
 convert data obtained based on at least one shared characteristic with the synchronized mobile device into a plurality of binary numbers;
 identify at least one bit for each of the plurality of binary numbers which are at least measurably random;
 detect an error condition with any of the determined bits for the plurality of binary numbers;
 select at least a portion of the determined bits for the plurality of binary numbers without the detected error condition; and
 generate a key based on the selected determined bits for the plurality of binary numbers for use in securing communications with the synchronized mobile device.

16. The device as set forth in claim 15 wherein the shared characteristic comprises movement of the synchronized mobile device.

17. The device as set forth in claim 16 wherein the movement of the synchronized mobile device has a set identifiable terminus.

18. The device as set forth in claim 16 wherein the one or more processors are further configured to execute the stored programmed instructions to:
 measure the movement of the synchronized mobile device with use of an emission provided by a superluminescent diode and modulated to at least 100 MHz.

19. The device as set forth in claim 15 wherein for the detecting the error condition, the one or more processors are further configured to execute the stored programmed instructions to:
 detect the error condition when any of identified bits for each of the plurality of binary numbers has an adjacent sequence of identically valued bits.

20. The device as set forth in claim 19 wherein the sequence of the identically valued bits comprises five or more of the identically valued bits.

21. The device as set forth in claim 15 wherein for the select, the one or more processors are further configured to execute the stored programmed instructions to:
 select one or more additional bits for each of the plurality of binary numbers which are not measurably random; and
 combine the selected one or more additional bits, wherein the generating the key is further based on the combined selected one or more additional bits.

* * * * *